(12) United States Patent
Kim

(10) Patent No.: US 6,878,075 B2
(45) Date of Patent: Apr. 12, 2005

(54) GOLF BALLS, GOLF BALL COMPOSITIONS, AND METHODS OF MANUFACTURE

(75) Inventor: Hyun Jin Kim, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 09/974,775

(22) Filed: Oct. 9, 2001

(65) Prior Publication Data

US 2003/0073512 A1 Apr. 17, 2003

(51) Int. Cl.$^7$ .............................................. A63B 37/00
(52) U.S. Cl. ...................................................... 473/351
(58) Field of Search ................................. 473/351, 377, 473/378, 367, 368

(56) References Cited

U.S. PATENT DOCUMENTS

| | | | | |
|---|---|---|---|---|
| 3,992,014 A | * | 11/1976 | Retford | 473/372 |
| 4,337,946 A | * | 7/1982 | Saito et al. | 473/356 |
| 4,424,307 A | * | 1/1984 | DiEdwardo et al. | 525/154 |
| 4,858,924 A | * | 8/1989 | Saito et al. | 473/373 |
| 4,971,329 A | * | 11/1990 | Llort et al. | 473/372 |
| 6,245,860 B1 | * | 6/2001 | Materne et al. | 525/331.8 |
| 6,508,724 B1 | * | 1/2003 | Dalton | 473/367 |
| 2003/0203763 A1 | | 10/2003 | Best | 473/290 |
| 2003/0203764 A1 | | 10/2003 | Dabbs et al. | 473/291 |

* cited by examiner

*Primary Examiner*—Raeann Gorden
(74) *Attorney, Agent, or Firm*—Sheppard, Mullin, Richter & Hampton LLP

(57) ABSTRACT

Golf balls and compositions for use in ball cores, covers and intermediate layers incorporate syndiotactic 1,2-polybutadiene having crystallinity and other specified physical properties. Golf balls incorporating the compositions of the present invention provide flexibility in golf ball design to improve ball performance, such as hit feel and spin rate, without adversely affecting shear-cut resistance of the ball. Also, methods for making golf balls include preparing a composition comprising syndiotactic 1,2-polybutadiene having crystallinity, and then incorporating the composition into a golf ball. The methods can include injection molding only, or injection and compression molding. When the composition being molded incorporates crosslinking agents, co-crosslinking agents, or crosslinking accelerators, preferred methods include inducing partial or total crosslinking of the composition at preferred steps of making the golf balls.

7 Claims, 2 Drawing Sheets

GOLF BALLS, GOLF BALL COMPOSITIONS, AND METHODS OF MANUFACTURE

BACKGROUND OF THE INVENTION

This invention relates generally to golf balls and golf ball compositions and, more particularly, to golf balls and golf ball compositions designed to optimize ball performance. This invention also relates to methods of manufacture of such golf balls and golf ball compositions.

Referring to FIGS. 2a–c, golf balls 10–14 generally include a core 16–20 and at least one layer 22–26 surrounding the core. Balls can be classified as two-piece, wound, or multilayer balls 10, 12, and 14, respectively. Two-piece balls 10 include a spherical inner core 16 and an outer cover layer 22. Wound balls 14 include a core 18, a rubber thread (not shown) wound under tension around the core to a desired diameter forming an intermediate layer 28, and a cover layer 24. Cover layers for wound ball generally are made of trans-polyisoprene or thermoset polyurethane. Multilayer balls 14 include a core 20, a cover layer 26, and one or more intermediate layers 30.

Generally, two-piece balls 10 have good durability and distance when hit, but poor "feel"—the overall sensation transmitted to the golfer while hitting the ball—and low spin rate, which results in poor ball control. Wound balls 12 having balata covers 24 generally have high spin rate, leading to good control, and they also have good feel, but they have poor durability and short distance in comparison to two-piece balls. Multi-layer balls 14 generally have performance characteristics between those of two-piece and wound balls; that is, multi-layer balls exhibit durability and distance inferior to two-piece balls but superior to wound balata balls, and they exhibit feel and spin rate inferior to wound balata balls but superior to two-piece balls.

Material characteristics of the compositions used in the core 16–20, cover 22–26, and any intermediate layers 28 and 30 of golf balls 10–14 are among the important factors that determine the performance of the balls. In particular, the composition of the cover layer is important in determining the ball's durability, shear-cut resistance, speed, spin rate, hitting sound (the sound made by a golf club head when it hits the ball), and feel. The composition of an intermediate layer is important in determining the ball's spin rate and speed. Various materials having different physical properties are used to make cover and intermediate layers to create a ball having the most desirable performance possible. In particular, cover layers of many commercially available balls are made using soft or hard ionomeric resins, elastomeric resins, or blends of these.

Ionomeric resins used generally are ionomeric copolymers of an olefin and a metal salt of a unsaturated carboxylic acid, or ionomeric terpolymers having a co-monomer within its structure. These resins vary in resiliency, flexural modulus, and hardness, based on differing acid content, degree of neutralization, and metal cation used for neutralization. Examples of these resins include those marketed under the trademark SURLYN manufactured by E. I. DuPont de Nemours & Company of Wilmington, Del., and IOTEK manufactured by Exxon Mobil Corporation of Irving, Tex. Ionomeric copolymers have been particularly favored for use in golf ball covers 22–26 because they produce ball covers having excellent durability and high resilience. Ionomeric terpolymers are used to produce covers having improved spin and feel, though at the cost of ball speed and durability. Elastomeric resins used in golf ball covers include a variety of thermoplastic or thermoset elastomers available, such as polyurethane, polyetherester elastomer, and polyamide elastomer.

Each of the materials discussed above has particular characteristics that can lead to good golf ball properties when used in a golf ball composition, either for making a ball cover 22–26 or intermediate layer 28 and 30. However, one material generally cannot optimize all of the important properties of a golf ball layer. Properties such as feel, speed, spin rate, resilience, and durability all are important, but improvement of one of these properties by use of a particular material often can lead to worsening of another. For example, ideally, a golf ball cover should have good feel and controllability, without sacrificing ball speed, distance, or durability. Despite the broad use of copolymeric ionomers in golf balls 10–14, their use alone in, for example, a ball cover can be unsatisfactory. A cover providing good durability, controllability, and feel would be difficult to make using only a copolymeric ionomer resin having a high flexural modulus, because the resulting cover, while having good distance and durability, also will have poor feel and low spin rate, leading to reduced controllability of the ball. Also, use of particular elastomeric resins alone can lead to compositions having unsatisfactory properties, such as poor durability and low ball speed.

Therefore, to improve golf ball properties, the materials discussed above can be blended to produce improved ball layers 22–30. Prior compositions for golf balls 10–14 have involved blending high-modulus copolymeric ionomer with, for example, lower-modulus copolymeric ionomer, terpolymeric ionomer, or elastomer. As discussed above, ideally a golf ball cover 22–26 should provide good feel and controllability, without sacrificing the ball's distance and durability. Therefore, a copolymeric ionomer having a high flexural modulus often is combined in a cover composition with a terpolymeric ionomer or an elastomer having a low flexural modulus. The resulting intermediate-modulus blend possesses a good combination of hardness, spin, and durability.

However, even with blending of materials to improve properties, use of the materials and blends discussed above has not been completely satisfactory. Improving one characteristic can lead to worsening another. For example, blending an ionomer having a high flexural modulus with an ionomer having a low flexural modulus can lead to reduced resilience and durability compared to use of the high-modulus ionomer alone. Also, the hardnesses of the compositions that can be obtained from these blends are limited, because durability and resilience get worse when hardness is lowed by increasing terpolymeric content of these blends. In general, it is difficult to make materials for use in, for example, a golf ball cover layer 22–26 that have good feel, high speed, high resilience, and good shear durability, and that are within a wide range of hardness. Additional compositions meeting these criteria therefore are needed.

In view of the above, it is apparent that golf ball compositions are needed that allow the optimization of many ball performance properties without the worsening of other properties. The ball compositions also should provide little or no processing and preparation difficulties over existing compositions. The present invention fulfills this need and other needs, and provides further related advantages.

SUMMARY OF THE INVENTION

The present invention is embodied in a golf ball comprising a syndiotactic 1,2-polybutadiene having a crystallinity between about 5% and about 50%, a mean molecular weight between about 10,000 and about 350,000, and a percentage of 1,2-bonds greater than about 70%. Preferably, the golf ball comprises a syndiotactic 1,2-polybutadiene having a crystallinity between about 10% and about 40%, and more preferably between about 15% and about 30%. Preferably, the golf ball comprises a syndiotactic 1,2-polybutadiene having a mean molecular weight between about 50,000 and about 300,000, more preferably between about 80,000 and about 200,000, and most preferably between about 100,000 and about 150,000. Preferably, the the golf ball comprises a syndiotactic 1,2-polybutadiene having a percentage of 1,2-bonds greater than about 80%, and more preferably greater than about 90%. The golf ball can further comprise UV stabilizers, photostabilizers, photoinitiators, co-initiators, antioxidants, colorants, dispersants, mold releasing agents, processing aids, inorganic fillers, organic fillers, or mixtures thereof.

The present invention also is embodied in a golf ball composition comprising a syndiotactic 1,2-polybutadiene having a crystallinity between about 5% and about 50%, a mean molecular weight between about 10,000 and about 350,000, and a percentage of 1,2-bonds of greater than about 70%, and ionomeric polymers, non-ionomeric polymers, or mixtures thereof, wherein the ratio by weight of syndiotactic 1,2-polybutadiene to the ionomeric polymers and non-ionomeric polymers ranges between about 5:90 and about 90:5. More preferably, the ratio by weight of syndiotactic 1,2-polybutadiene to the ionomeric polymers and non-ionomeric polymers ranges between about 10:90 and about 80:20, most preferably about 10:90 and about 70:30. The ionomeric polymers can comprise copolymeric polymers, terpolymeric polymers, or mixtures thereof.

The composition can further comprise a crosslinking agent, co-crosslinking agent, crosslinking accelerator, or mixtures thereof. When the composition comprises a crosslinking agent, the ratio by weight of crosslinking agent to syndiotactic 1,2-polybutadiene, ionomeric polymers and non-ionomeric polymers preferably ranges between about 0.1:100 and about 10:100, and more preferably between about 0.1:100 and about 5:100. When the composition comprises crosslinking accelerator, co-crosslinking agent, or mixtures thereof, the ratio by weight of crosslinking accelerator and co-crosslinking agent to syndiotactic 1,2-polybutadiene, ionomeric polymers and non-ionomeric polymers preferably ranges between about 0.1:100 and about 20:100, and more preferably between about 0.1:100 and about 10:100.

The golf ball composition preferably can comprise a copolymer having a glycidyl group, hydroxyl group, maleic anhydride group or carboxylic group. When the composition comprises such a copolymer, the ratio by weight of the copolymer to the syndiotactic 1,2-polybutadiene, ionomeric polymers and non-ionomeric polymers preferably ranges between about 1:100 and about 20:100, and more preferably between about 1:100 and about 15:100.

The present invention also resides in a method for making a golf ball, comprising: preparing a composition comprising a syndiotactic 1,2, polybutadiene having a crystallinity between about 5% and about 50%, a mean molecular weight between about 10,000 and about 350,000, and a percentage of 1,2-bonds greater than about 70%; and incorporating the composition into the golf ball. The step of preparing a composition can comprise a step of dry-blending the composition, or a step of mixing the composition using a mill, internal mixer or extruder. The step of mixing the composition can comprise melting the composition.

The method can comprise: preparing a concentrate comprising a syndiotactic 1,2, polybutadiene having a crystallinity between about 5% and about 50%, a mean molecular weight between about 10,000 and about 350,000, and a percentage of 1,2-bonds greater than about 70%, and a crosslinking agent, a crosslinking accelerator, a co-crosslinking agent, a copolymer having a glycidyl group, a hydroxyl group, a maleic anhydride group, or a carboxylic group, a terpolymer having a glycidyl group, a hydroxyl group, a maleic anhydride group, or a carboxylic group, or mixtures thereof, and adding the concentrate to a syndiotactic 1,2, polybutadiene having a crystallinity between about 5% and about 50%, a mean molecular weight between about 10,000 and about 350,000, and a percentage of 1,2-bonds greater than about 70%, an ionomeric polymer, a non-ionomeric polymer, or mixtures thereof.

The method also can comprise: preparing a concentrate comprising an ionomeric polymer and a crosslinking agent, a crosslinking accelerator, a co-crosslinking agent, a copolymer having a glycidyl group, a hydroxyl group, a maleic anhydride group, or a carboxylic group, a terpolymer having a glycidyl group, a hydroxyl group, a maleic anhydride group, or a carboxylic group, or mixtures thereof; and adding the concentrate to a syndiotactic 1,2, polybutadiene having a crystallinity between about 5% and about 50%, a mean molecular weight between about 10,000 and about 350,000, and a percentage of 1,2-bonds greater than about 70%, an ionomeric polymer, a non-ionomeric polymer, or mixtures thereof.

The method also can comprise: preparing a concentrate comprising a non-ionomeric polymer and a crosslinking agent, a crosslinking accelerator, a co-crosslinking agent, a copolymer having a glycidyl group, a hydroxyl group, a maleic anhydride group, or a carboxylic group, a terpolymer having a glycidyl group, a hydroxyl group, a maleic anhydride group, or a carboxylic group, or mixtures thereof; and adding the concentrate to a syndiotactic 1,2, polybutadiene having a crystallinity between about 5% and about 50%, a mean molecular weight between about 10,000 and about 350,000, and a percentage of 1,2-bonds greater than about 70%, an ionomeric polymer, a non-ionomeric polymer, or mixtures thereof.

In the method, the step of incorporating the composition into a golf ball can comprise injection molding the composition to form a spherical layer of the golf ball. Additionally, the ball can comprise a central portion, and the step of incorporating the composition into a golf ball can comprises injection molding the composition to form a first and a second half shell, the half shells configured to mate to form a spherical layer, and compression molding the first and second half shells over the central portion to form a spherical layer.

The step of incorporating the composition into a golf ball can comprise incorporating a composition comprising a crosslinking agent, co-crosslinking agent, crosslinking accelerator, or mixtures thereof into the golf ball. In preferred embodiments of the method, the step of preparing the composition comprises: inducing crosslinking in the composition during mixing of the composition, or inducing crosslinking in the composition by injection molding the composition to form a portion of the golf ball, preferably forming dimples on an outer surface of the portion during injection molding. Additional preferred embodiments of the method comprise: injection molding the composition to form a portion of the golf ball and inducing crosslinking of the composition by compression molding the portion, preferably forming dimples on an outer surface of the portion during compression molding; or, inducing crosslinking in the composition by exposing the composition to radiation of an intensity and type sufficient to induce crosslinking. An additional preferred embodiment of the present invention comprises injection molding the composition to form two half-shells configured to form a spherical layer when joined together, and inducing crosslinking in the composition by compression molding the two half-shells to join the half-shells to form a spherical layer of the golf ball.

Other features and advantages of the present invention should become apparent from the following detailed description of the preferred embodiments.

DESCRIPTION OF THE PREFERRED EMBODIMENTS

Figure 2A:
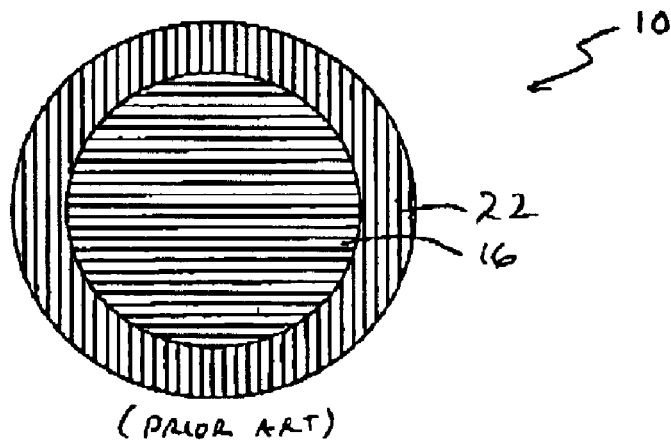
FIGS. 2a–c are cross-sectional illustrations of prior art golf balls.
Figure 2B:
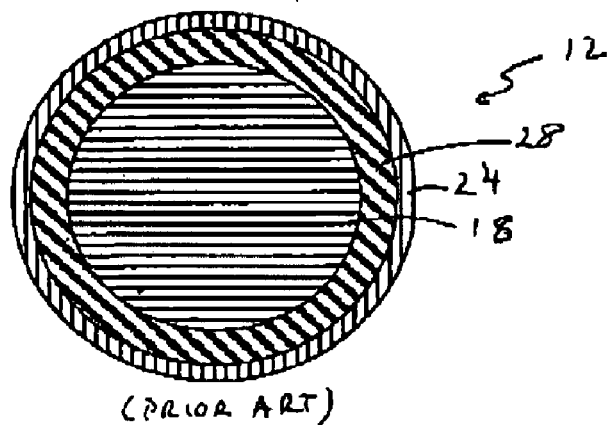
Figure 2C:
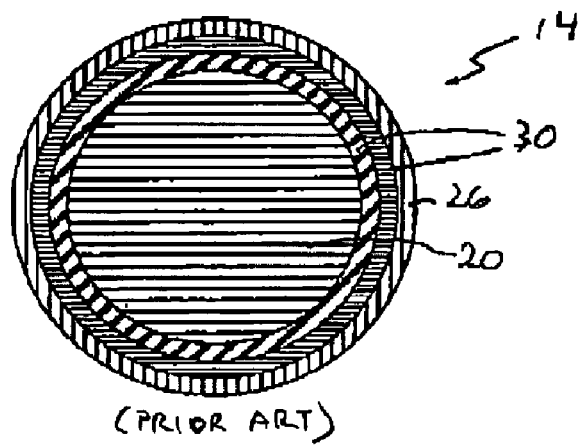

Referring to FIGS. 2a–c, the present invention is embodied in golf balls 10–14 and compositions for use in making golf balls that incorporate syndiotactic 1,2-polybutadiene having crystallinity. The invention also is embodied in golf ball covers 22–26, intermediate layers 28 and 30, core 16–20 made from the above-specified compositions, and it additionally is embodied in methods of manufacture of balls incorporating these compositions. Compositions within the scope of the present invention provide flexibility in golf ball design to improve ball performance, such as hit feel and spin rate, without adversely affecting shear-cut resistance of the ball.

Figure 1:
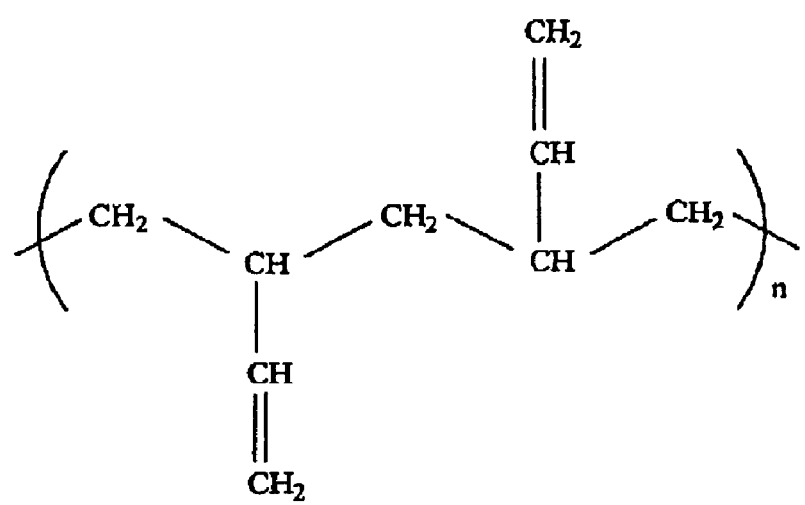
FIG. 1 is an illustration of the structure of syndiotactic 1,2-polybutadiene.

Many different types of 1,2-polybutadienes exist, having widely varying physical properties based on their differing tacticity, crystallinity, and molecular weight. Examples of 1,2-polybutadienes having differing tacticity are atactic 1,2-polybutadiene, isotactic 1,2-polybutadiene, and syndiotactic 1,2-polybutadiene. Syndiotactic polymers include alternating base units that are enantiomers of each other. In particular, the structure of syndiotactic 1,2-polybutadiene is represented by FIG. 1. These 1,2-polybutadienes are also differentiated by crystallinity, ranging from amorphous 1,2-polybutadienes essentially lacking crystallinity to semi-crystalline 1,2-polybutadienes having different crystallinities in their structures. Also, molecular weights of these 1,2-polybutadienes can be within a wide range. These various combinations of tacticity, crystallinity and molecular weight provide for many different types of 1,2-polybutadienes having very different processability, as well as other chemical, thermal, mechanical, and rheological properties.

Syndiotactic 1,2-polybutadiene having crystallinity suitable for use in compositions within the scope of the present invention are polymerized from 1,2-addition of butadiene. Golf balls 10–14 within the scope of the present invention include syndiotactic 1,2-polybutadiene having crystallinity and having greater than about 70% of 1,2-bonds, more preferably greater than about 80%, and most preferably greater than about 90%. Golf balls within the scope of the present invention include syndiotactic 1,2-polybutadiene having crystallinity between about 5% and about 50%, more preferably about 10% and about 40%, and most preferably between about 15% and about 30%. Golf balls within the scope of the present invention include syndiotactic 1,2-polybutadiene having crystallinity and a mean molecular weight between about 10,000 and about 350,000, more preferably between about 50,000 and about 300,000, more preferably between about 80,000 and about 200,000, and most preferably between about 10,000 and about 150,000. An example of a suitable syndiotactic 1,2-polybutadiene having crystallinity for use in golf balls within the scope of the present invention polybutadiene is sold under the trade name RB810, RB820, and RB830 by JSR Corporation of Tokyo, Japan. These have more than 90% of 1,2 bonds, mean molecular weight of approximately 120,000, and crystallinity between about 15% and 30%.

Preferred embodiments of the present invention suitable for use in making golf ball cores 16–20, intermediate layers 28 and 30, or covers 22–26 include compositions comprising (a) syndiotactic 1,2-polybutadiene having crystallinity along with (b) ionomeric polymers comprising copolymeric or terpolymeric polymers, or (c) non-ionomeric polymers, or a combination of (b) and (c), wherein the ratio of syndiotactic 1,2-polybutadiene having crystallinity to the combined amount of (b) and (c) ranges between about 5:90 and about 90:5. More preferably, this ratio ranges between about 10:90 and about 80:20, and most preferably, this ratio ranges between about 10:90 and about 70:30. Preferably, these compositions further include one or more additional components, such as (d) crosslinking agent, (e) co-crosslinking agent or crosslinking accelerator, and (f) copolymers or terpolymers having a glycidyl group, hydroxyl group, maleic anhydride group or carboxylic group. When crosslinking accelerators are used, the composition can further comprise activators for the crosslinking accelerators. Preferably, the ratio of crosslinking agent to that of the total of syndiotactic 1,2-polybutadiene having crystallinity, (b), and (c) ranges between about 0.1:100 and about 10:100 by weight. More preferably, this ratio ranges between about 0.1:100 and about 5:100 by weight. Preferably, the ratio of co-crosslinking agent or crosslinking accelerator to that of the total of syndiotactic 1,2-polybutadiene having crystallinity, (b), and (c) ranges between about 0.1:100 and about 20:100 by weight. More preferably, this ratio ranges between 0.1:100 and about 10:100 by weight. Preferably, the ratio of (f) to that of the total of syndiotactic 1,2-polybutadiene having crystallinity, (b), and (c) ranges between about 1:100 and about 20:100 by weight. More preferably, this ratio ranges between about 1:100 and about 15:100 by weight.

Golf balls 10–14 and ball compositions within the scope of the present invention also can include, in suitable amounts, one or more additional ingredients generally employed in golf balls and ball compositions. Agents provided to achieve specific functions, such as additives and stabilizers, can be present. Suitable ingredients include UV stabilizers, photostabilizers, antioxidants, colorants, dispersants, mold releasing agents, and processing aids. Compositions suitable for crosslinking using radiation preferably include photo-initiators, co-initiators, or mixtures of these. Examples of these photo-initiators and co-initiators include dibenzoyl methane, methyl benzoyl formate, benzopinacol, 4-chlorobenzophenone, camphorquinone, 4-chloropropiophenone, 2-ethyl anthraquinone, ethyl p-dimethylamino benzoate, 2-mercaptobenzoxazole, N-phenyl glycine, lophine dimerdibromochalcone, 2,2'-bis (2-chlorophenyl)-4,4',5,5'-tetraphenyl-1,1'-biimidazole, 2,2'-bis(2-ethoxyphenyl)-4,4',5,5'-tetraphenyl-1,1'-biimidazole, and 2-(1-naphtyl)-4,5-diphenyl-1,2'-biimidazole.

Golf balls 10–14 and golf ball compositions within the scope of the present invention also can incorporate inorganic fillers, such as titanium dioxide, calcium carbonate, zinc sulfide or zinc oxide. Additional fillers can be chosen to impart additional density to blends of golf balls and ball compositions within the scope of the present invention, such as zinc oxide, barium sulfate, tungsten or any other metallic powder having density higher than that of base polymeric resin. Any organic or inorganic fibers, either continuous or non-continuous, also can be in the compositions.

As discussed above, suitable ionomeric polymers for use in the compositions of the present invention include copolymeric ionomers and terpolymeric ionomers, or mixture of those. Copolymeric ionomers are obtained by neutralizing at least portion of carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Copolymeric ionomers include ionomers having varied acid contents and degrees of acid neutralization, neutralized by monovalent or bivalent cations, such as lithium, sodium, potassium, magnesium, calcium, barium, lead, tin, zinc, aluminum, or a combination of these.

Terpolymeric ionomers are obtained by neutralizing at least portion of carboxylic groups in a terpolymer of an α-olefin, and an α,β-unsaturated carboxylic acid having 3 to 8 carbon atoms and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Terpolymeric ionomers includes ionomers having varied acid contents and degrees of acid neutralization, neutralized by monovalent or bivalent cations, such as lithium, sodium, potassium, magnesium, calcium, barium, lead, tin, zinc, aluminum, or a combination of these.

Suitable non-ionomeric polymers for use in golf balls 10–14 and ball compositions of the present invention include thermoplastic elastomer, thermoset elastomer, thermoplastic rubber, thermoplastic vulcanizate, polycarbonate, polyolefin, polyamide, copolymeric polyamide, polyesters, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, styrenic terpolymer, cellulose polymer, liquid crystal polymer (LCP), ehtylene-propylene-diene-monomer (EPDM), ethylene vinyl acetate (EVA), and polysiloxane. Particularly suitable non-ionomeric polymers for use within the scope of the present invention include polyethyleneterephthalate, polybutyleneterephthalate, polyphenylenesulfide, polypropyleneoxide, polyphenyloxide, polypropylene, polyethylene, polycarbonate, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), dynamically vulcanized polypropylene/ethylene-propylene-diene-copolymer, polyether or polyester thermoplastic urethane, and thermoset polyurethane. Suitable polyamides include resins obtained by: polycondensation of a dicarboxylic acid, such as oxalic acid, adipic acid, sebacic acid, terephthalic acid, isophthalic acid or 1,4-cyclohexylidicarboxylic acid, with a diamine, such as ethylenediamine, tetramethylenediamine, pentamethylenediamine, hexamethylenediamine or decamethylenediamine, 1,4-cyclohexyldiamine or m-xylylenediamine; a ring-opening polymerization of cyclic lactam, such as ε-caprolactam or ω-laurolactam; polycondensation of an aminocarboxylic acid, such as 6-aminocaproic acid, 9-aminononaoic acid, 11-aminoudecanoic acid or 12-aminododecanoic acid; or, copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46. Another suitable non-ionomeric polymer for use within the scope of the present invention is a block copolymer having at least one polymer block comprising an aromatic vinyl compound and at least one polymer block comprising a conjugated diene compound, and having a hydroxyl group at a block copolymer, or its hydrogenated product.

Some examples of suitable non-ionomeric polymers include those sold under the trademarks LEXAN, VALOX, NORYL, and NORYL GTX, marketed by GE Plastics of Pittsfield, Mass., CRISTAMID and RILSAN marketed by ATOFINA Chemicals of Philadelphia, Pa., GRILAMID marketed by EMS-CHEMIE of Sumter, S.C., ZYTEL marketed by E. I. DuPont de Nemours & Co. of Wilmington, Del., TENITE marketed by Eastman Chemical Company of Kingsport, Tenn., EXXPOL marketed by Exxon Mobil of Houston, Tex., ESTANE marketed by B F Goodrich of Cleveland, Ohio, and HG-252 and SEPTON marketed by Kuraray Company of Kurashiki, Japan.

As discussed above, golf balls 10–14 and ball compositions within the scope of the present invention can include copolymers or terpolymers having a glycidyl group, hydroxyl group, maleic anhydride group or carboxylic group. These copolymers and terpolymers comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-dococene, 1-tetracocene, 1-hexacocene, 1-octacocene, and 1-triacontene. One or more of these α-olefins may be used. Examples of suitable glycidyl groups in copolymers or terpolymers for use within the scope of the present invention include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5-diglyxidylcarboxylate, cyclohexene-4-glycidyl carobxylate, 5-norboenene-2-methyl-2-glycidyl carboxylate, and endocis-bicyclo(2,2,1)-5-heptene-2,3-diglycidyl dicaroboxylate. These polymer having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers. Examples of suitable terpolymers having a glycidyl group include LOTADER AX8900 and LOTADER AX8920 marketed by Elf-Atochem Company, ELVALOY marketed by Du Pont, REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride-terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Elf-Atochem; EXXELOR VA1803, a maleic anyhydride-modified ethylene-propylene coploymer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Shell Chemical.

Examples of suitable crosslinking agents for use within the scope of the present invention include sulfur compounds and peroxides. Examples of suitable sulfur compounds include sulfur donors and soap-sulfurs, such as dithiodimorpholine (DTDM), caprolactamdisulfide, N,N'-dithio bis-(hexahydro-2H-azepinone), 2-morpholino-dithio-benzothiazole, dipentamethylene thiuramtetrasulfide, N-oxydiethylene dithiocabamyl-N'-oxydiethylene sulfeamide, and tetramethyl thiuramdisulfide. Examples of suitable peroxide compounds include aliphatic peroxides or aromatic peroxides, such as diacetylperoxide, di-tert-butylperoxide, dibenzoylperoxide, dicumylperoxide, 2,5-bis-(t-butylperoxy)-2,5-dimethyl hexane, 2,5-dumethyl-2,5-di(benzoylperoxy)hexane, 2,5-dimethyl-2,5-di(butylperoxy)$_3$-hexyne, n-butyl-4,4-bis(t-butylperoxyl) valerate, 1,4-bis-(t-butylperoxyisdpropyl)-benzene, t-butyl peroxybenzoate, and 1,1-bis(t-butylperoxy)-3,3,5 tri-methylcyclohexane, di(2,4-dichloro-benzoyl). Examples of other suitable crosslinking agents include m-pheylenedimaleimide, poly-p-dinitrosobenzene, tellurium, selenium, diisocyanates, triisocyanates, aromatic polyisocyanate, polyisocyanate, polymethylolphenolic resins, polyamines, quinonedioximes, and 4,4' methylenebis(cyclohexylamine)carbamate. Copolymers or terpolymers having a glycidyl group, hydroxyl group, maleic anhydride group or carboxylic group also can participate as crosslinking agents.

Examples of suitable crosslinking accelerators or co-crosslinking agents for use within the scope of the present invention include 2-mercaptobenzothiazole, zinc-2-mercaptobenzothiazole, dibenzothiazyl disulfide, N-cyclohexyl-2-benzothiazylsulfenamide, N-ter-butyl-2-benzothiazylsulfenamide, 2-benzothiazyl-N-sulfenemorpholide, N,N-dicyclohexyl-2-benzothiazylsulfenamide, tetramethylthiuram disulfide, tetramethylthiuram monosulfide, tetraethylthiuram disulfide, dimethyldiphenylthiuram disulfide, dipentamethylenethiuram tetrasulfide, zinc dimethyldithicarbmate, zinc diethyldithicarbmate, zinc dibutyldithiocarbamate, zinc pentamethylenedithiocarbamate, zinc ethylpheyldithiocarbamate, zinc ethylphenyldithicarbamate, zinc dibenzyldithiocarbamate, piperadine pentamethylenedithiocarbamate, sodium dimethyldithiocarbamate, sodium dibutyldithiocarbamate, selenium dimethyldithiocarbamate, lead dimethyldithiocarbamate, cadmium dimethyldithiocarbamate, cadmium pentamethylenedithiocarbamate, copper dimethyldithiocarbamate, copper dibutyldithiocarbamate, bismuth dimethyldithiocarbamate, dithiocarbamylsulfenamide, N-oxydiethylenedithiocarbamyl-N'-oxydiethylenesulfenamide, zinc isopropylxanthate, zinc butylxanthate, sodium isopropylxanthate, diphenylguadine, do-o-tolylguadine, o-tolylbiguadine, butyraldehydeaniline, tricrotonylidenetetramine, hexamethylenetetramine, polyethylenepolyamines, cyclohexylethylamine, dibutylamine, N,N'-ethylenethiourea, N,N-diphenylthiourea, N,N'-diethylthiourea, zinc dibutyldithiophosphate, copper diisopropyldithiophosphate, 2-benzothiazole-N-morpholyldisulfide, dimorpholine disulfide zinc acrylate, zinc diacrylate, zinc stearate, zinc laurate, and other fatty acids.

As discussed above, golf balls 10–14 and ball compositions within the scope of the present invention can include activators for crosslinking accelerators, co-crosslinking agents or crosslinking agents. Suitable examples of these include ZnO, MgO, Ca(OH)$_2$, PbO, dibutylaminooleate, ethanolamine, di-ethanolamine, 1,3-diphenylguanidinephthalate, tri-ethanolamine, butylamine, di-butylamine, di-benzylamine, zinc acrylate, zinc diacrylate, zinc stearate, zinc laurate, and other fatty acids.

The additional components discussed above (that is crosslinking agent, crosslinking accelerator, and copolymers or terpolymers having a glycidyl group, hydroxyl group, maleic anhydride group or carboxylic group) can be mixed into syndiotactic 1,2-polybutadiene having crystallinity, ionomeric polymers, non-ionomeric polymers, or combinations of these, with or without melting the syndiotactic 1,2-polybutadiene having crystallinity, ionomeric polymers, and non-ionomeric polymers. Dry blending equipment, such as a tumbler mixer, V-blender, or ribbon blender, can be used to mix the compositions incorporating syndiotactic 1,2-polybutadiene having crystallinity, ionomeric polymers, and non-ionomeric polymers. The additional components discussed above also can be mixed together or added sequentially to the composition using a mill, internal mixer, extruder or combinations of these, with or without application of thermal energy to produce melting or chemical reaction. In preparing the preferred embodiments discussed above, any of the additional components can be premixed with the syndiotactic 1,2-polybutadiene having crystallinity, ionomeric polymers, or non-ionomeric polymers to produce a concentrate having a high concentration of the additional components. Then, this concentrate can be introduced into a blend of syndiotactic 1,2-polybutadiene having crystallinity, ionomeric polymer, non-ionomeric polymer, or combinations of these, using dry blending or melt mixing. The additional components also can be added to a color concentrate, which is then added to the composition to impart a white color to golf ball 10–14. During a melt mixing process, partial crosslinking can be produced by adjusting the resin composition, screw rpm, or processing temperature, if necessary. Any combination of the above-mentioned mixing methods can be used to produce a final composition within the scope of the present invention.

Compositions within the scope of the present invention that do not incorporate crosslinking agents or crosslinking accelerators preferably are prepared prior to or during an injection molding process to produce a molded core 16–20, intermediate layer 28 and 30, or cover layer 22–26 for a golf ball 10–14. For example, a layer can be prepared from a composition within the scope of the present invention by injection molding a complete layer directly over a ball core or intermediate layer. Alternatively, the layer can be prepared by injection molding of two half-shells (not shown) made from the composition, and then forming the two half-shells into a completed layer by compression molding them over a ball core or intermediate layer.

Compositions within the scope of the present invention that do incorporate crosslinking agents, crosslinking accelerators or activators preferably are prepared using the dry blending or melt mixing methods discussed above, to mold a core 16–20, intermediate layer 28 and 30 or cover layer 22–26 of a golf ball 10–14. Various methods within the scope of the present invention for forming portions of golf balls take advantage of use of crosslinking agents in the compositions by inducing partial or full crosslinking at various stages of formation of ball cores, intermediate layers, or cover layers. Conditions of the processes used for forming the ball portions can be adjusted to induce the preferred amount of crosslinking and the preferred stages of the process. By adjusting the amount of crosslinking in the compositions, the material properties of the compositions can be tailored as preferred. For example, during injection molding of a layer, crosslinking can be induced by adjusting processing conditions, such as barrel temperature, mold temperature, and cure time. Also, exposure of the formed core, intermediate layer or cover layer to, for example, appropriate levels or radiation can be used to induce a preferred amount of crosslinking in compositions within the scope of the present invention.

In one preferred method, the composition can be partially crosslinked during the mixing process, and then molded into a core 16–20, intermediate layer 28 and 30 or cover 22–26 using injection molding, compression molding, or a combination of the two. Another preferred method for making a core, intermediate layer, or cover from compositions within the scope of the present invention involves using forming a composition without inducing crosslinking, and then injection molding the core, intermediate layer, or cover under conditions to induce partial or full crosslinking. Another preferred method involves injection molding a core, intermediate layer, or cover without inducing crosslinking, and then using inducing partial or full crosslinking using secondary methods, such as compression molding or exposure to radiation. In another preferred method, an intermediate layer or a cover can be prepared by injection molding half-shells (not shown), and then inducing crosslinking during compression molding to form a complete layer.

When used to form a cover layer 22–26, a preferred embodiment of the method involves preparing the cover layer using injection molding and forming dimples on the surface of the cover layer, inducing full or partial curing of the layer during the injection molding process. Alternately, the cover layer can be formed using injection molding without dimples (not shown), and then the layer can be compression molded to form dimples and induce fill or partial cross-linking.

EXAMPLE

Two dozen each of three types of golf balls 10, having covers 22 incorporating compositions within the scope of the present invention were prepared. The balls incorporated cores 16 each having a diameter of 1.58 inches and a PGA compression of 65, and they incorporated covers 0.05 inches thick.

The compositions incorporating SURLYN 6120 ionomer and RB810 syndiotactic 1,2-polybutadiene having crystallinity, in varying percentages. The particular compositions and hardnesses of the covers are shown in Table 2 below.

TABLE 1

Cover Compositions

|  | Ball 1 | Ball 2 | Ball 3 |
|---|---|---|---|
| RB810 wt. % | 20 | 30 | 40 |
| SURLYN 6120 wt % | 80 | 70 | 60 |
| Shore D Hardness | 66 | 62 | 58 |

Each of the finished balls 10 was tested for PGA compression, and also for speed and spin rate when struck by a driver (not shown) and by a 8 iron (not shown) under controlled conditions. The balls also were tested for two shear-cut resistance indices, $I_S$ and $I_B$, in comparison to two reference balls. Shear cut resistance was rated from a scale of 1 (excellent) to 5 (poor). These raw shear cut resistance figures were used to calculated the indices. $I_S$ was the shear-cut resistance of the test ball divided by the shear-cut resistance of a ball having a core 16 and ionomer cover layer 22, with a Shore D hardness of 60. $I_B$ was the shear-cut resistance of the test ball divided by the shear-cut resistance of a ball having a wound core and a balata cover layer, with a Shore D hardness of 50. The data for Balls 1 to 3 are shown in Table 2 below.

TABLE 2

Ball Performance Data

|  | Ball 1 | Ball 2 | Ball 3 |
|---|---|---|---|
| PGA Compression | 79 | 75 | 69 |
| Driver Speed mph | 160.8 | 160.0 | 159.2 |
| Driver Spin Rate rpm | 2895 | 2895 | 3050 |
| 8 Iron Speed mph | 109.2 | 108.9 | 108.6 |
| 8 Iron Spin Rate rpm | 7762 | 7870 | 7993 |
| $I_S$ | 0.65 | 0.75 | 0.85 |
| $I_B$ | 0.26 | 0.30 | 0.34 |

Discussion

The data for Balls 1–3 indicate that increasing the percentage of syndiotactic 1,2-polybutadiene having crystallinity in the cover composition leads to only a slight reduction in driver and 8 Iron speed, while allowing for a wide range of hardnesses. Cover hardness is a major factor in the feel of a ball 10–14 when hit. Increasing the percentage of polybutadiene in the cover 22 from 20% to 40% resulted in a reduction in hardness from Shore D 66 to 58. The reduced hardness allows for improved ball feel, but leads to only a slight decrease in driver speed; merely 1.6 mph. At the same time, increased polybutadiene in the cover composition leads to substantially increased 8 Iron spin rate; an increase of 231 rpm. This increased 8 Iron spin rate allows for improved controllability of the golf ball. Therefore, use of compositions within the scope of the present invention allows for balls having high driver speed, good ball feel, and good controllability.

Additionally, the shear-cut indices of Balls 1–3 all were below 1, indicating that Balls 1 to 3 had far superior shear cut resistance than those of the reference balls 10–14. This shear cut resistance remains superior to that of the reference balls even when cover hardness is decreased.

Although the invention has been disclosed in detail with reference only to the preferred embodiments, those skilled in the art will appreciate that additional golf ball covers 22–26 can be made without departing from the scope of the invention. Accordingly, the invention is identified by the following claims.

I claim:

1. A golf ball composition comprising:
    a syndiotactic 1,2-polybutadiene having a crystallinity between about 5% and about 50%, a mean molecular weigh between about 10,000 and about 350,000, and a percentage of 1,2-bonds of greater than about 70%; and
    a crosslinking agent, co-crosslinking agent, crosslinking accelerator, or mixtures thereof;
    wherein the ratio by weight of the syndiotactic 1,2-polybutadiene to the ionomeric polymers ranges between about 5:90 and about 90:5, and the ratio by weight of the crosslinking agent to the syndiotactic 1,2-polybutadiene and the ionomeric polymers ranges between about 0.1:100 and about 10:100.

2. A golf ball composition as defined in claim 1, wherein the ratio by weight of the crosslinking agent to the syndiotactic 1,2-polybutadiene and the ionomeric polymers ranges between about 0.1:100 and about 5:100.

3. A golf ball composition comprising:
    a syndiotactic 1,2-polybutadiene having a crystallinity between about 5% and about 50%, a mean molecular weight between about 10,000 and about 350,000, and a percentage of 1,2-bonds of greater than about 70%; and
    a crosslinking agent, co-crosslinking agent, crosslinking accelerator, or mixtures thereof;
    wherein the ratio by weight of the syndiotactic 1,2-polybutadiene to the ionomeric polymers ranges between about 5:90 and about 90:5, and the ratio by weight of the crosslinking accelerator and the co-crosslinking agent to the syndiotactic 1,2-polybutadiene and the ionomeric polymers ranges between about 0.1:100 and about 20:100.

4. A golf ball composition as defined in claim 3, wherein the ratio by weight of the crosslinking accelerator and the co-crosslinking agent to the syndiotactic 1,2-polybutadiene and the ionomeric polymers ranges between about 0.1:100 and about 10:100.

5. A golf ball composition comprising:
    a syndiotactic 1,2-polybutadiene having a crystallinity between about 5% and about 50%, a mean molecular weight between about 10,000 and about 350,000, and a percentage of 1,2-bonds of greater than about 70%;
    polymers selected from the group consisting of ionomeric polymers, non-ionomeric polymers and mixtures thereof; and
    a copolymer having a glycidyl group, hydroxyl group, maleic anhydride group or carboxylic group;
    wherein the ratio by weight of the syndiotactic 1,2-polybutadiene to the polymers ranges between about 5:90 and about 90:5.

6. A golf ball composition as defined in claim 5, when the ratio by weight of the copolymer having a glycidyl group, hydroxyl group, maleic anhydride group or carboxylic group to the syndiotactic 1,2-polybutadiene and the polymers ranges between about 1:100 and about 20:100.

7. A golf ball composition as defined in claim 6, wherein the ratio by weight of te copolymer having a glycidyl group, hydroxyl group, maleic anhydride group or carboxylic group to the syndiotactic 1,2-polybutadiene and the polymers ranges between about 1:100 and about 15:100.

* * * * *

UNITED STATES PATENT AND TRADEMARK OFFICE
CERTIFICATE OF CORRECTION

PATENT NO. : 6,878,075 B2
DATED : April 12, 2005
INVENTOR(S) : Hyun Jin Kim

It is certified that error appears in the above-identified patent and that said Letters Patent is hereby corrected as shown below:

Column 12,
Line 1, "fill" should be -- full --.

Column 13,
Line 20, "weigh" should be -- weight --.
Line 21, after "about 70%;" please add the following paragraph -- ionomeric polymers; and --.
Line 38, after "about 70%;" please add the following paragraph -- ionomeric polymers; and --.

Column 14,
Line 28, "when" should be -- wherein --.
Line 34, "te" should be -- the --.

Signed and Sealed this

Fourteenth Day of June, 2005

JON W. DUDAS
*Director of the United States Patent and Trademark Office*